United States Patent
Reddy (10) Patent No.: US 9,443,552 B2
(45) Date of Patent: Sep. 13, 2016

(54) AUTOMATIC TRACK DESCRIPTION GENERATOR

(75) Inventor: Prafulla Bollampalli Reddy, Longmont, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 1001 days.

(21) Appl. No.: 12/342,886

(22) Filed: Dec. 23, 2008

(65) Prior Publication Data

US 2010/0161917 A1    Jun. 24, 2010

(51) Int. Cl.
*G06F 12/00* (2006.01)
*G11B 20/12* (2006.01)
*G06F 3/06* (2006.01)

(52) U.S. Cl.
CPC .......... *G11B 20/1217* (2013.01); *G06F 3/0601* (2013.01); *G11B 2020/1232* (2013.01); *G11B 2020/1278* (2013.01); *G11B 2020/1281* (2013.01); *G11B 2020/1287* (2013.01); *G11B 2220/2516* (2013.01)

(58) Field of Classification Search
None
See application file for complete search history.

(56) References Cited

U.S. PATENT DOCUMENTS

| | | |
|---|---|---|
| 5,406,426 A | 4/1995 | Culley |
| 5,940,862 A | 8/1999 | Erickson |
| 6,295,176 B1 * | 9/2001 | Reddy et al. ................. 360/48 |
| 2010/0161917 A1 * | 6/2010 | Reddy ......................... 711/156 |

* cited by examiner

*Primary Examiner* — Brian Peugh
(74) *Attorney, Agent, or Firm* — HolzerIPLaw, PC (57) ABSTRACT

A method includes generating a track description in real-time describing at least a portion of a track of a storage medium. An apparatus includes a dynamic track description generator configured to dynamically generate a track description describing a data wedge of a track on a storage medium, wherein the track description is generated at a time prior to synchronization with the data wedge.

16 Claims, 12 Drawing Sheets

AUTOMATIC TRACK DESCRIPTION GENERATOR

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An embodiment of a system is operable to dynamically generate a track description of at least a portion of a track on a storage medium such. The track description can be generated automatically in real-time. This real-time generation of the track description frees up valuable memory that would otherwise be used for a track description table for other use.

An embodiment of a method provides for accessing locations on a storage medium having tracks on which data can be stored in data sectors. The method includes dynamically generating a track description describing at least a portion of a track. The track description may comprise a track description entry that includes one or more parameters describing a portion of the track.

BRIEF DESCRIPTION OF THE DRAWINGS

The described technology is best understood from the following Detailed Description describing various implementations read in connection with the accompanying drawings.

DETAILED DESCRIPTIONS

An embodiment of a system is operable to dynamically generate a track description of at least a portion of a track on a storage medium. The track description can be generated automatically in real-time, thereby obviating the need for a track description table to be permanently stored in memory. As such, valuable memory that would otherwise be used for a track description table is freed for other use.

An embodiment of a method provides for accessing locations on a storage medium having tracks on which data can be stored in data sectors. The method includes dynamically generating a track description describing at least a portion of a track. The track description may comprise a track description entry that includes one or more parameters describing a portion of the track.

In at least one embodiment, the tracks are substantially circular and the storage medium is logically segmented into a plurality of data wedges. In this embodiment, a track description entry includes a physical block displacement (PBD), a last sector fragment index (LSFI), and a last sector fragment length (LSFL). The PBD indicates a sector displacement from a starting location of a track, the LSFI indicates which sector fragment is the last sector fragment in a data wedge, and LSFL indicates the number of symbols in the last sector fragment in the data wedge.

The PBD, LSFI and LSFL are typically determined for a given data wedge prior to the system being synchronized to the given data wedge. In one embodiment, the PBD, LSFI and LSFL are determined during a data wedge time between a trailing edge of a first servo synchronization wedge and a leading edge of a second servo synchronization wedge. The first servo synchronization wedge is prior to a data wedge prior to the given data wedge and the second servo synchronization wedge is prior to the given data wedge.

After the track description entry is generated for a given data wedge, the system can compare the sector indicated by the PBD to a sector of interest to determine if the given data wedge includes the sector of interest. The given data wedge then can be navigated based on the PBD, LSFI and LSFL and the data in the sector of interest is processed (e.g., stored to or read from the storage medium).

Figure 1:
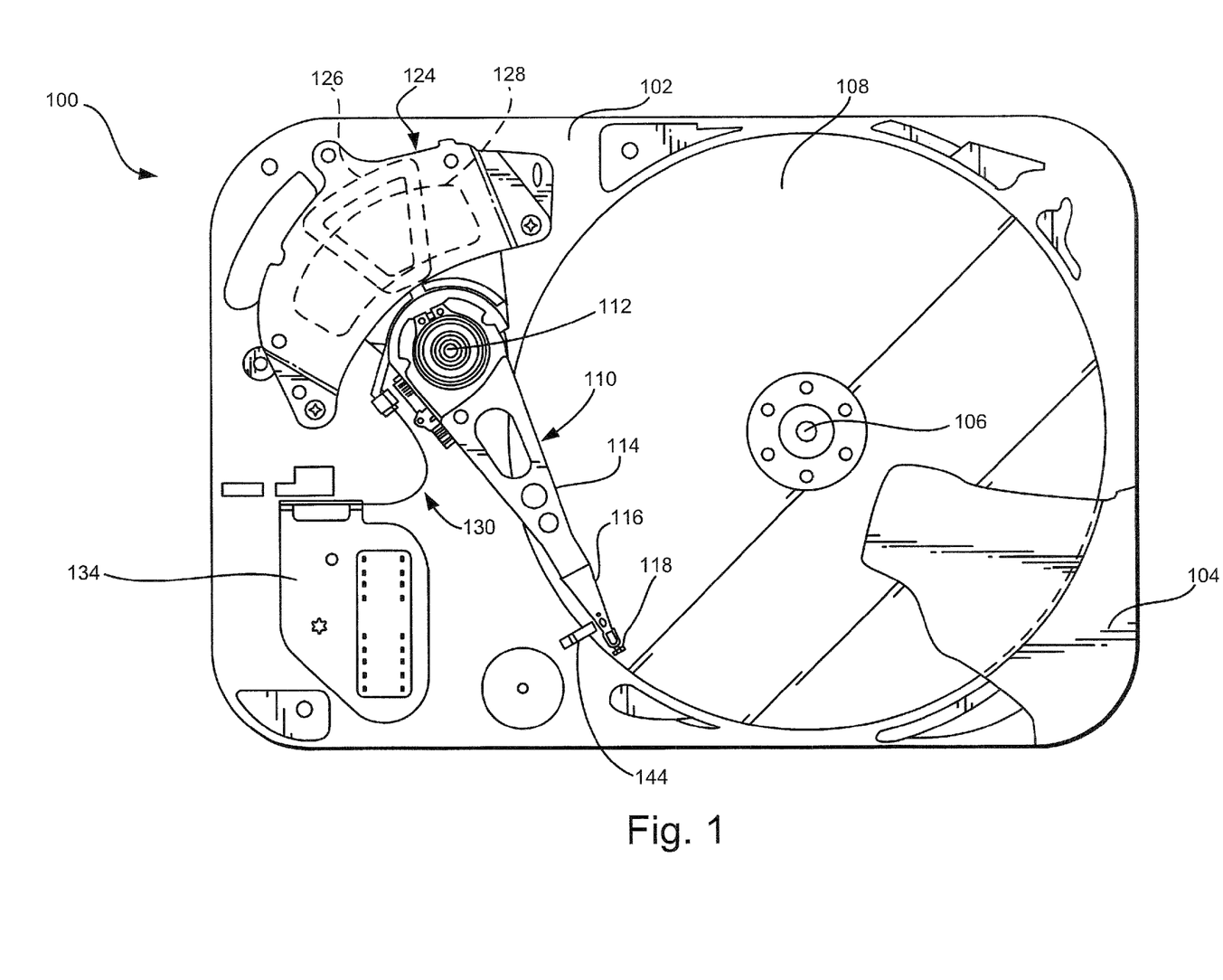
FIG. 1 illustrates a plan view of an example disc drive.

One device that may implement automatic track description generation exemplified herein is a hard disc drive 100. FIG. 1 illustrates a plan view of an example disc drive 100, The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more storage medium discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 that extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 180. The distance between the head 118 and the storage media surface during flight is referred to as the "fly height".

During a seek operation, the track position of the head 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 1010 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved away from portions of the disk 108 containing data when the drive motor is de-energized. The heads 118 are secured over portions of the disk not containing data through the use of an actuator latch arrangement and/or ramp assembly 144, which prevents inadvertent rotation of the actuator assembly 110 when the drive discs 108 are not spinning.

A flex assembly 130 provides the requisite electrical connection paths for the actuator assembly 110 while allowing pivotal movement of the actuator assembly 110 during operation. The flex assembly 130 includes a printed circuit board 134 to which a flex cable connected with the actuator assembly 100 and leading to the head 118 is connected. The flex cable may be routed along the actuator arms 114 and the flexures 116 to the heads 118. The printed circuit board 134 typically includes circuitry for controlling the write currents applied to the heads 118 during a write operation and a preamplifier for amplifying read signals generated by the heads 110 during a read operation. The flex assembly 130 terminates at a flex bracket for communication through the base deck 102 to a disc drive printed circuit board (not shown) mounted to the bottom side of the disc drive 100.

Figure 2:
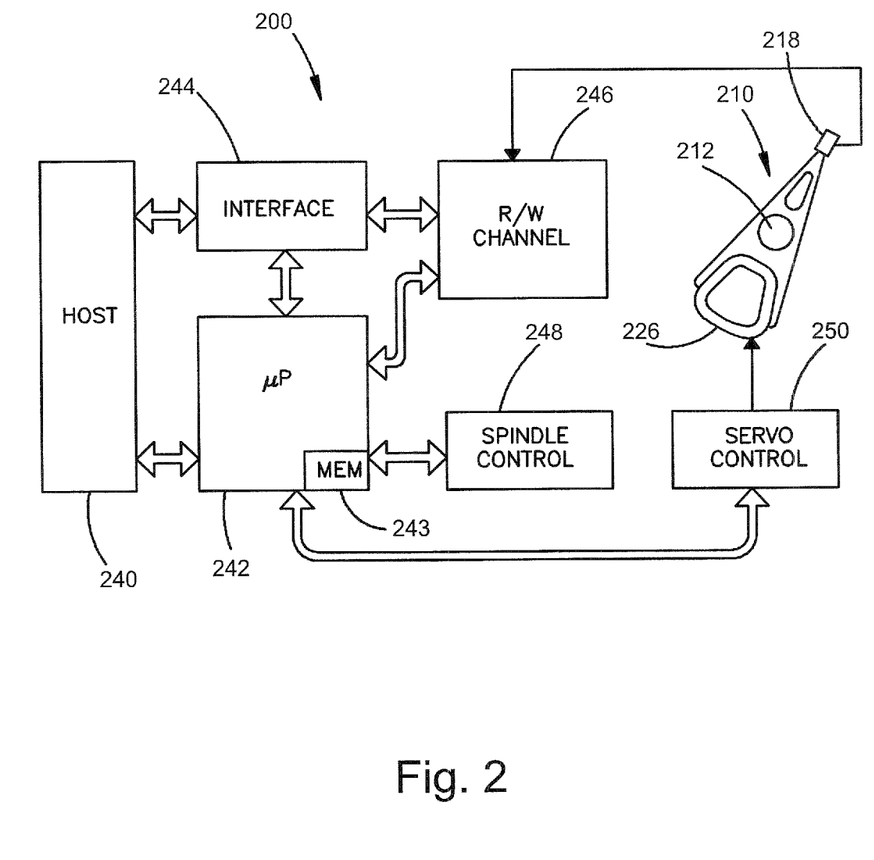
FIG. 2 illustrates the example functional components of a disc drive.

FIG. 2 illustrates the primary functional components of a disc drive incorporating one of the various implementations of the described technology and generally shows the main functional circuits that are resident on the disc drive printed circuit board and used to control the operation of the disc drive. The disc drive is operably connected to a host computer 240 in a conventional manner. Control communication paths are provided between the host computer 240 and a disc drive microprocessor 242, the microprocessor 242 generally providing top level communication and control for the disc drive in conjunction with programming for the microprocessor 242 stored in microprocessor memory (MEM) 243. The MEM 243 can include random access memory (RAM), read only memory (ROM) and other sources of resident memory for the microprocessor 242.

The discs are rotated at a constant high speed by a spindle motor control circuit 248, which typically electrically commutates the spindle motor through the use, typically, of back electromotive force (BEMF) sensing. During a seek operation, wherein an actuator 210 moves heads 218 between tracks on the storage media, the position of the heads 218 is controlled through the application of current to the coil 226 of a voice coil motor. A servo control circuit 250 provides such control. During a seek operation the microprocessor 242 receives information regarding the velocity of the head 218, and uses that information in conjunction with a velocity profile stored in memory 243 to communicate with the servo control circuit 250, which will apply a controlled amount of current to the voice coil motor coil 226, thereby causing the actuator assembly 210 to be pivoted.

According to embodiments described herein, microprocessor 242 initializes a small set of parameters that describe a portion of the initial data track wedge. In order for the hardware described here to generate parameters per data wedge that indicate, for every sector fragment in the data wedge, its relative sector displacement from the start of the track and the fragment displacement from the start of the current data wedge and idle length of the last data fragment of the data wedge. It is assumed that, if there are multiple data fragments in the data wedge, all the remaining data fragments terminate a complete sector. In the case of the initial data fragment, its initial running length within a sector is remembered by the hardware, since the running length of the last fragment of its associated sector for the previous data wedge was previously calculated by the hardware.

These parameters initialized by microprocessor 242 may include physical block displacement (PBD), last sector fragment index (LSFI) and last sector fragment length (LSFL). PBD indicates the sector displacement from the start of a track. LSFI indicates which sector fragment is the last sector fragment in a data wedge. LSFL indicates the running number of symbols in the last sector fragment in the data wedge. In addition, the running length of the previous data wedge's last data fragment within its associated sector is remembered and initialized into media counting hardware in the controller that counts to sector boundaries for non-last fragments of the current data wedge.

In the case of the last data fragment of the wedge, the media counting hardware in the controller counts to the last fragment length. In the case that the last fragment completes a sector, the media counting hardware in the controller counts to the sector boundary only, since the associate LSFL value is initialized to a value greater than any possible sector size supported. In the case that the last fragment of the previous data wedge was a complete sector, the media counting hardware that counts to sector boundaries within the data wedge is initialized to zero for the current data wedge. In the case of the last data wedge of a track, the hardware may limit the number of data fragments in the wedge if sectors cannot be split across track boundaries. A sector fragment can be a whole data sector or a partial data sector. Embodiments are not limited to a particular data sector size. Data wedges are sections of the disc and are described in more detail below with reference to FIG. 3.

The set of parameters generated by the hardware for each data wedge allow media counting hardware in the controller to compare with a target PDB previously initialized by the microprocessor in order to process that sector and any subsequent sectors on the track, based on the transfer length programmed by the microprocessor. All sectors are processed by the hardware from the beginning of the sector. Once processing of a target sector begins, other controller hardware increments the target sector to indicate the next sector of interest to be processed. Thus, given the parameters necessary to navigate a given data wedge of a track may be provided by generating and providing parameters for every sector fragment of the given data wedge.

With further regard to PBD, LSFI and LSFL, these values are used to locate the desired data sector on the disc and process the data in the desired data sector. Specifically, other controller hardware compares PBD to a target sector displacement initialized by firmware to determine if a given data sector on the disc is the desired sector. The media counting hardware in the controller uses the LSFI to determine if a given sector is the last sector fragment in a data wedge. The media counting hardware in the controller compares LSFL to a counter that counts the number of media symbols processed for a given sector fragment. LSFL can be equal to or less than the number of symbols in a complete sector.

Data is transferred between the host computer 240 or other device and the disc drive by way of an interface 244, which typically includes a buffer to facilitate high speed data transfer between the host computer 240 or other device and the disc drive. Data to be written to the disc drive is thus passed from the host computer 240 to the interface 244 and then to a read/write channel 246, which encodes and serializes the data into data symbols and provides the requisite write current signals to the heads 218. Symbols have a size in terms of a number of bits. Symbol size is not limited to any particular number of bits, but can vary depending on the encoding scheme used by the read/write channel 246. To retrieve data that has been previously stored in the data storage device, read signals are generated by the heads 218 and provided to the read/write channel 246, which performs decoding and error detection and correction operations and outputs the retrieved data to the interface 244 for subsequent transfer to the host computer 240 or other device.

Figure 3:
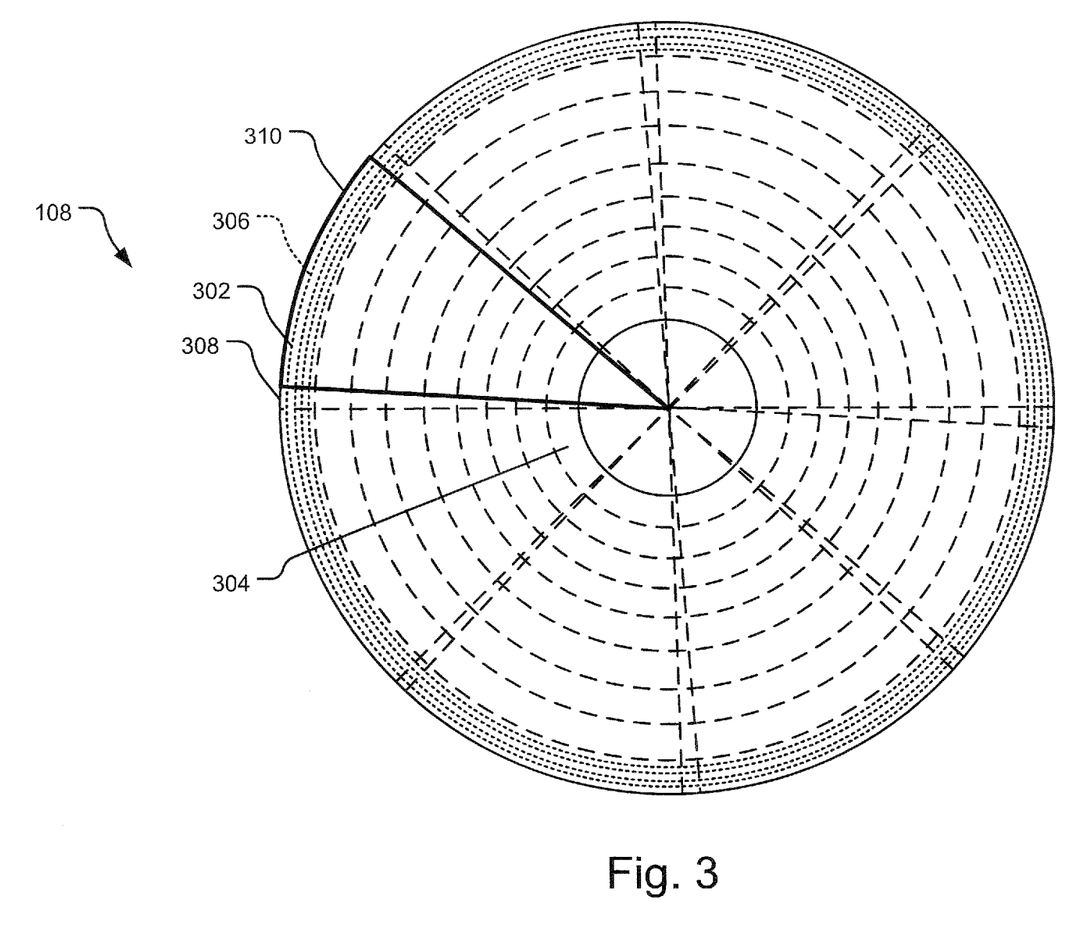
FIG. 3 is a plan view of a disc according to one embodiment.

FIG. 3 illustrates an example disc 108. Disc 108 includes a number of concentric zones, illustrated by circular dotted lines. The outermost zone may be referred to as the outer diameter zone 302 and the innermost zone may be referred to as the inner diameter zone 304. Each zone includes a number of data tracks 306 on which data is stored. Data tracks 306 are substantially circular. Date tracks 306 are only shown on the outer diameter zone 302 in FIG. 3, but it should be understood that other zones include data tracks.

Servo wedges 308 extend radially from the center of the disc 108 outwardly traversing the zones. Servo wedges 308 are used by the servo control circuit in the disc drive to position the heads. Servo wedges 308 logically segment the disc 108 into a number of logical sections called data wedges 310. Between each adjacent pair of servo wedges 308 are wedge-shaped regions referred to as data wedges 310 where data is stored in sectors. There typically are many more servo wedges 308 and data wedges 310 than shown in FIG. 3. For example, there may be one hundred or more servo wedges 308 and a corresponding number of data wedges 310.

Figure 4:
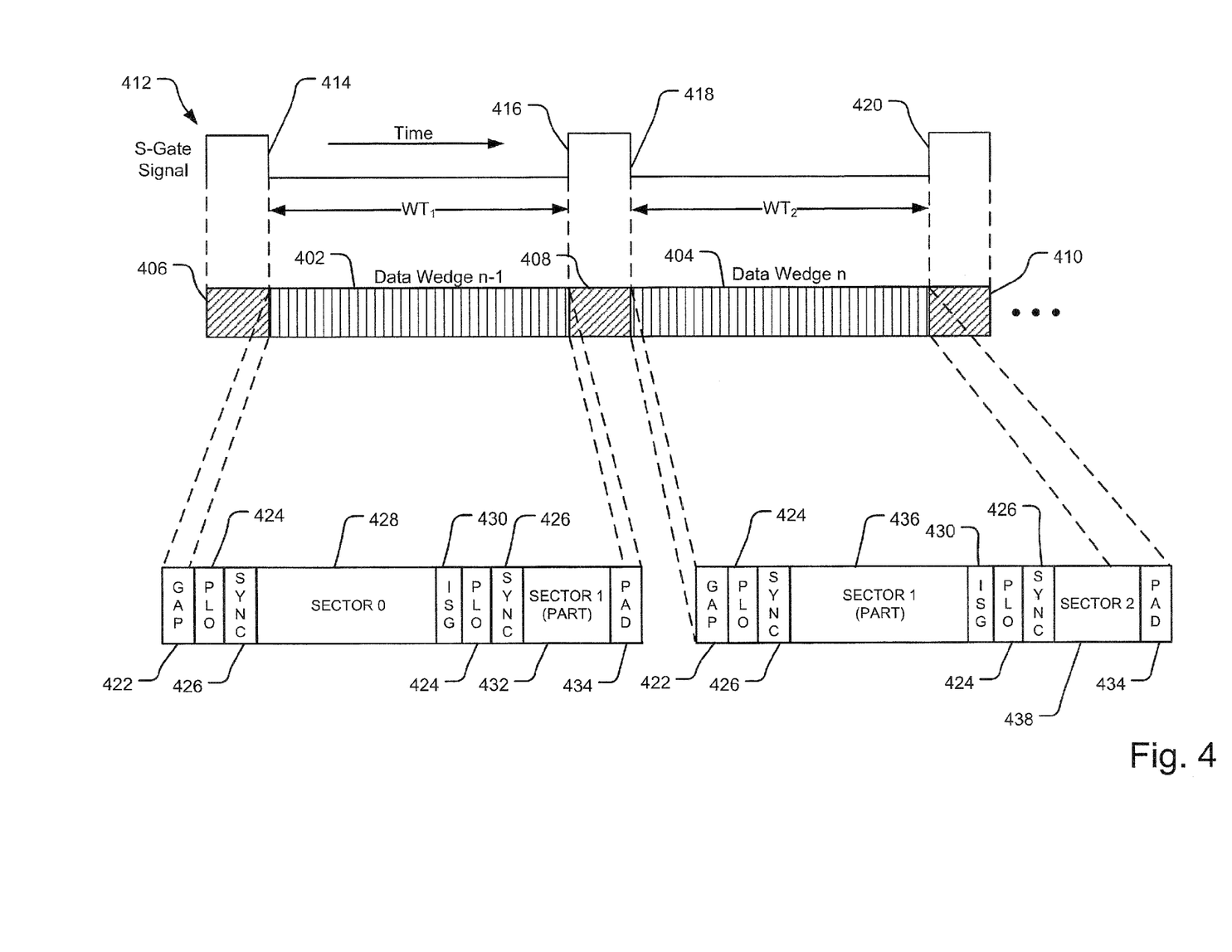
FIG. 4 illustrates example data wedges and their component fields between servo control wedges.

FIG. 4 abstractly illustrates a "side-on" view of two data wedges: data wedge 402 and data wedge 404. Data wedge 402 is between servo wedge 406 and servo wedge 408. Data wedge 404 is between servo wedge 408 and servo wedge 410. An S-Gate signal 412 is generated in substantial synchronization with the servo control wedges. When servo wedge 406 is read, S-Gate signal 412 rises. The end of servo wedge 406 causes a falling (trailing) edge 414 before data wedge 402 is read. After data wedge 402, servo wedge 408 causes rising (leading) edge 416 in the S-Gate signal 412. The end of servo wedge 408 causes another falling edge 418 in S-Gate signal 412. Data wedge 404 is then read, followed by another rising edge 420 caused by servo wedge 410.

Data wedge 402 is sequentially ahead of data wedge 404. As such, data wedge 402 is referred to as data wedge (n-1) and data wedge 404 is referred to as data wedge (n). The time from falling edge 414 and rising edge 416 is wedge time 1 ($WT_1$); the time from falling edge 418 and rising edge 420 is wedge time 2 ($WT_2$). As is understood in the art, the wedge time interval (e.g., $WT_1$ and $WT_2$) is a common unit of time that is substantially constant, since the servo wedges are spaced circumferentially in a substantially periodic manner, and the disk spins at a substantially fixed rate. For example, for a disk that has 250 servo wedges per servo track, and spins at approximately 7200 revolutions per minute (rpm), one rising edge of SGATE to SGATE interval represents approximately 33 microseconds (μs). The duration when SGATE is active over the servo field may be, for example, about 1 μs, leaving roughly 32 μs for processing of the data wedge.

In the illustrated embodiment, data wedge (n-1) 402 includes a number of fields. An exemplary layout of fields is shown in FIG. 4. It should be understood that the layout of fields can vary from data wedge to data wedge and from zone to zone. As shown in FIG. 4, data wedge (n-1) includes a servo synchronization gap (or simply 'gap') 422, a phase lock oscillator (PLO) field 424 and a synchronization field 426 prior to sector data. Gap 422, PLO 424 and sync 426 generally enable control logic to phase lock and sync to data in data wedge (n-1) 402. A first sector (Sector 0) fragment 428 is a section of the disc where user data symbols can be read from and/or written to. In the illustration sector fragment 428 is a full sector.

Following sector fragment 428 is an inter-sector gap (ISG) 430, another PLO 424 and another synchronization field 426, which enable control logic to phase-lock and synchronize to a partial sector fragment 432 of another sector (Sector 1) beginning in data wedge (n-1) 402. Sector fragment 432 (i.e., an incomplete portion of sector 1) is followed by a pad 434. Pad 434 typically includes a set of meaningless dummy bits.

Data wedge (n) 404 similarly includes a number of fields. Some of the fields are substantially similar to fields in data wedge (n-1) 402 in terms of their purpose and duration. For example, data wedge (n) 404 includes a gap 422, followed by a PLO 424 and synchronization field 426 to enable phase-lock and synchronization. After synchronization field 426, another partial sector fragment 436 exists. Sector fragment 436 completes Sector 1, which begins in data wedge (n-1) 402 with partial sector fragment 432. Like data wedge (n-1) 402, data wedge (n) 404 next includes an ISG 430, a PLO 424 and a synchronization field 426. Another full sector 438, Sector 2, is next, followed by another pad 434.

The starting and ending of each data fragment results in a WG transition, which is also known as a write splice. These write splices are subsumed into the GAP fields of the input parameters initialized into registers that act as inputs for the hardware described herein.

In order to locate and access a desired sector, a track description entry is generated for each of one or more data wedges on a track. A track description entry includes a number of parameters describing a data wedge. In one embodiment, the parameters include a physical block displacement (PBD), a last sector fragment index (LSFI) and last sector fragment length (LSFL). The PBD, LSFI and LSFL are determined based on the sizes of the fields in the data wedges. An example 4 byte track description entry is shown below in Table 1:

TABLE 1

| Bit# | 7 | 6 | 5 | 4 | 3 | 2 | 1 | 0 | Bit# |
|---|---|---|---|---|---|---|---|---|---|
| 31 | | | | LSFL (11:4) | | | | | 24 |
| 23 | LSFL (3:0) | | | | Rsvd | Rsvd | Rsvd | LSFI (4) | 16 |
| 15 | LSFI (3:0) | | | | PBD (11:8) | | | | 8 |
| 7 | | | | PBD (7:0) | | | | | 0 |

In Table 1, PBD is 12 bits, LSFI is 5 bits and LSFL is 12 bits. PBD spans from bit 0 through bit 11, LSFI spans from bit 12 through bit 16 and LSFL spans from bit 20 through bit 31. Of course, the particular arrangement in Table 1 is illustrative of only one possible arrangement and embodiments are not so limited.

According to at least one embodiment, each track description entry is generated for a given data wedge prior in time to the read/write heads being over the given data wedge. For example, PBD, LSFI and LSFL for a given data wedge are determined prior to reading the servo synchronization wedge prior to the given wedge. For example, the PBD, LSFI and LSFL for data wedge (n-1) 402 are determined during $WT_1$ (i.e., between trailing edge 414 and leading edge 416). In one embodiment, the trailing edge of each S-Gate servo signal triggers the system to determine the parameters for the following data wedge. As such the track description parameters for the current wedge (i.e., parameters for sectors immediately after the trailing edge of the S-Gate) have already been determined.

It should be noted track description generation generally starts at data wedge 0, whereas the read/write heads of the disc drive may be over any arbitrary data wedge. As such, the track description generator may need to "catch up" to the heads by starting the analysis at data wedge 0 on a given track and iteratively generating a track description entry for each data wedge up to the data wedge that the heads are over, and continuing (if necessary) until the sector of interest is located. For example, the heads may currently be over data wedge 60 and the sector of interest may be in data wedge 65. Dynamic track description begins at data wedge 0 and quickly iterates through all the data wedges up to 60. Then, as discussed above, a track description entry for each subsequent data wedge is generated during the wedge time just prior to each subsequent data wedge.

Figure 5:
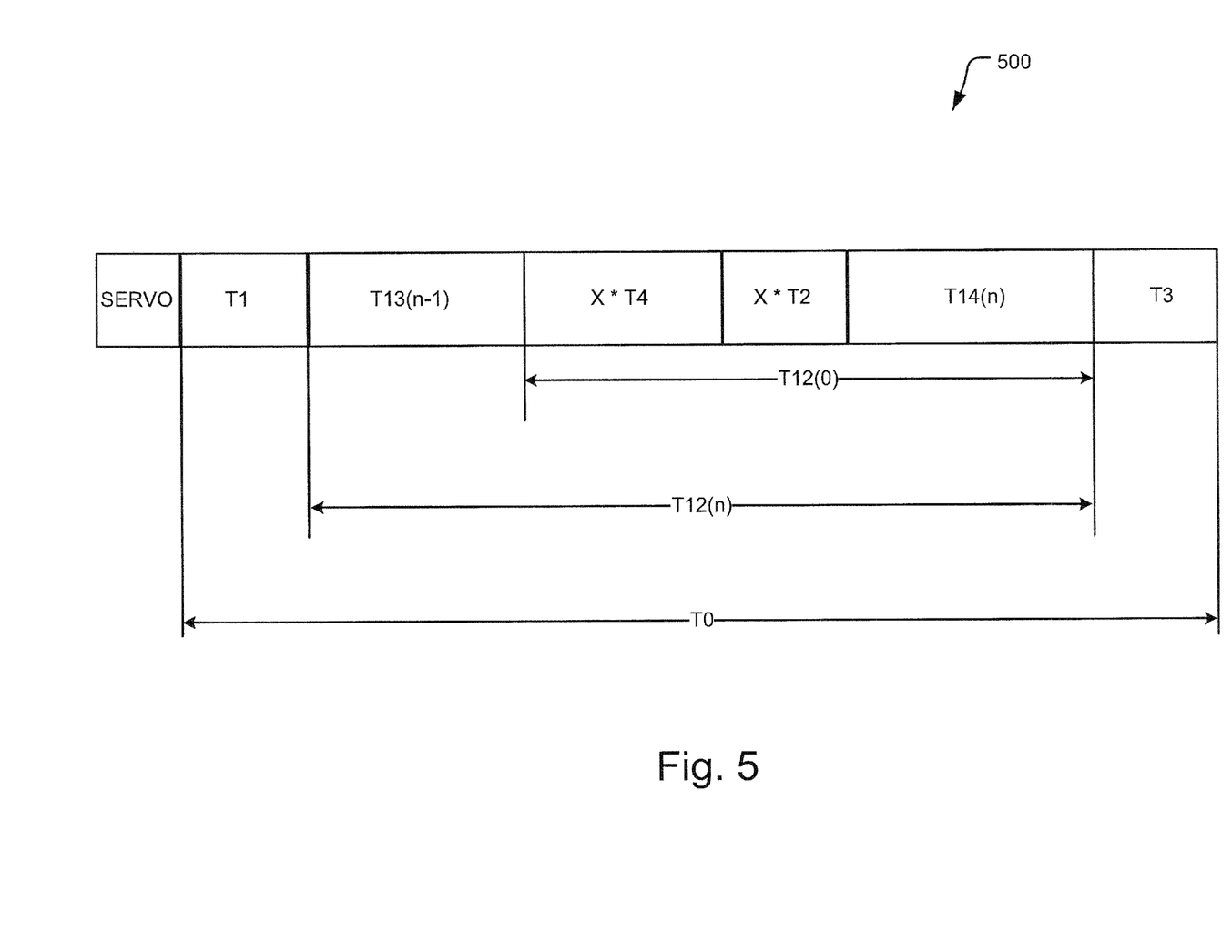
FIG. 5 illustrates a model including defined values used for generating a track description entry.

FIG. 5 is a generalized model 500 of field lengths associated with data wedges on a disc. The following values are used in conjunction with the model:

T0: The number of symbols per wedge=WT/symbol clock period. This is the total number of symbols available in the data wedge plus the attendant overhead at the start and end of the data wedge which must exist in every useable data wedge. This value is required to calculate the value T11.

T1: Sum of lengths of gap, write splice, PLO and synch fields. This is the overhead to start the initial data fragment in a useable data wedge.

T2: Sum of lengths of pad, write splice, ISG, write splice, PLO and sync fields.

T3: Sum of lengths of pad and write splice. This is the overhead that must exist if the wedge is a useable data wedge.

T4: The number of symbols per completed sector.

T5: T4+T2.

T6: The number of symbols of disc sequence overhead required to process a sector fragment.

T8: The minimum number of symbols in a partial sector fragment.

T9: The maximum number of symbols in a partial sector fragment.

T10: T1+T3. This is the overhead that must exist in every data wedge if the data wedge is a useable data wedge.

T11: T0−T10. This is the Initial Wedge Symbol Count with no accumulated symbol count from previous wedges.

n: The offset from the starting wedge of the track.

X: Number of full sector fragments in wedge "n".

T12(n): A virtual size of the wedge 'n'; includes sector fragment contribution from wedge 'n-1'.

T13(n-1): The previously accumulated length of an incomplete sector prior to wedge n.

T14(n): Sector fragment size that terminates wedge 'n' before the value calculated in T13(n-1) is modified to account for boundary conditions ("boundary update).

T13(n): Sector fragment size that terminates wedge 'n' after boundary update.

Sector_Offset(n): Number of completed sectors from the beginning of the track to the end of wedge 'n'.

Sector_Count(n): Number of complete sectors in wedge 'n'.

A full sector fragment is a sector fragment whose size is equal to T4 symbols. A partial sector fragment is a sector fragment whose size is less than T4 symbols. The term "complete sector" or "completed sector" refers to a full sector fragment or multiple partial sector fragments whose sum comprises T4 symbols. Model 500 groups certain field sizes together in a way that captures data wedge field sizes of recurring fields or sets of fields. For example, T1 represents the sum of the sizes of the servo synchronization gap, the write splice, the PLO and the synchronization field, which generally recur from wedge to wedge. A write splice refers to a Write Gate/Read Gate transition area on the media. Write splice occurs at the start of a sector fragment and at the end of a sector fragment.

FIGS. 6-11 are described in view of the foregoing model 500 and term definitions. FIGS. 6-11 illustrate algorithms that can be carried out in the disc drive to provide automatic track description according to an embodiment.

Figure 6:
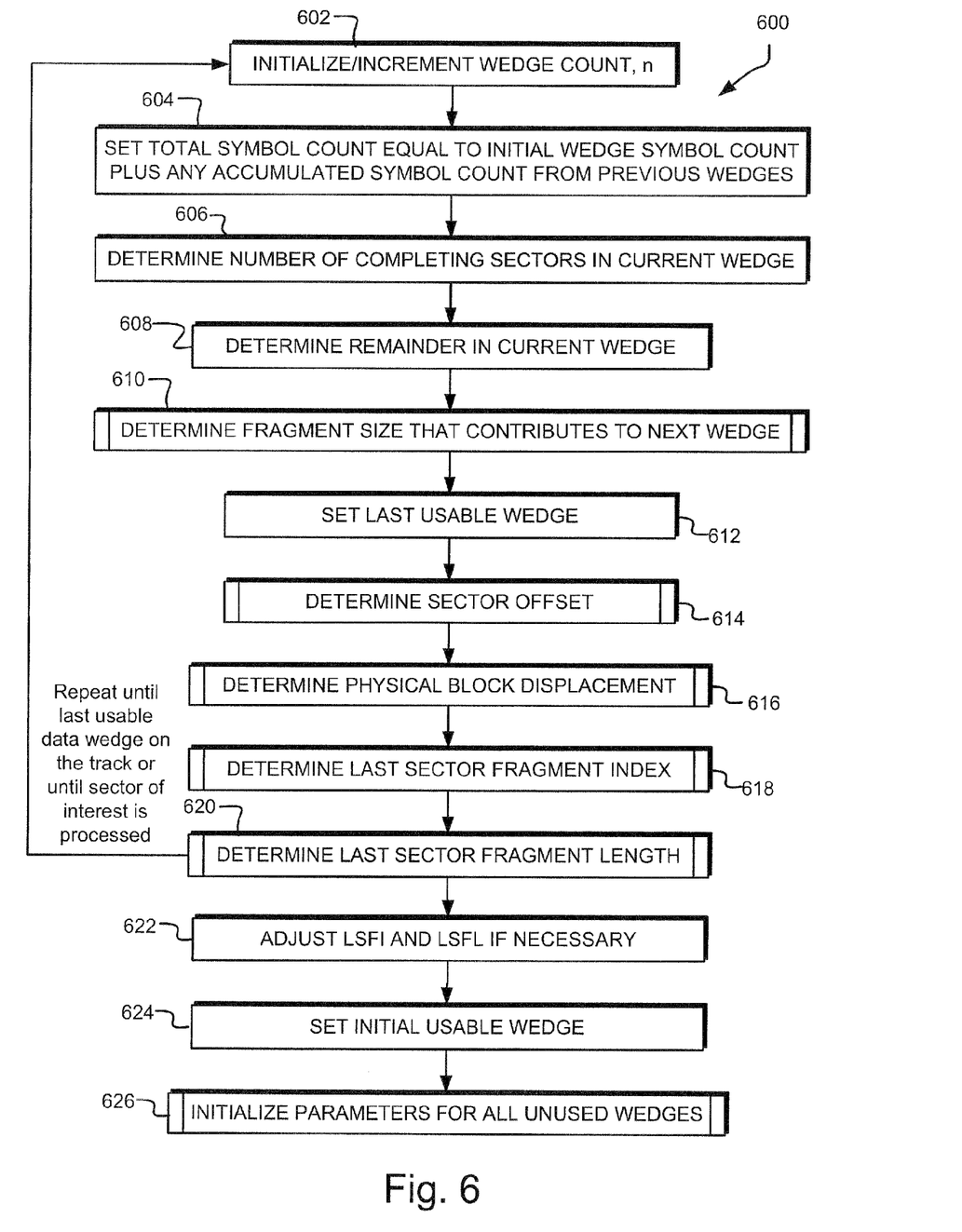
FIGS. 6-12 are flow charts illustrating algorithms for carrying out dynamic track description generation.

Referring to FIG. 6, the algorithm begins with a initializing/incrementing operation 602 where a data wedge counter, n, is initialized to designate the first data wedge on a track. In one embodiment, initializing/incrementing operation 602 sets 'n' equal to 0 and increments 'n' when another data wedge is selected in later iterations. In a setting operation 604, the total symbol count is set equal to the initial wedge symbol count plus any accumulated sector symbol count from a previous wedge or wedges. It is assumed that when 'n' equals zero (i.e., the initial data wedge), there is no previously accumulated partial sector fragment symbols that contribute to total symbol count.

Setting operation 604 sets the total symbol count, T12, equal to T11 for 'n' equal to 0 and sets T12 equal to T11+T13(n-1) for 'n' not equal to 0. It is assumed that the initial data wedge symbol count, T11, is known (e.g., stored in memory) or is easily computed based on the wedge time, the symbol clock period and the set sizes of non-data sector parameters in the data wedge. Non-data sector symbols refer to any symbols that are not included in user data sector. Examples of non-data sector symbols are symbols in the synchronization gap, PLO, ISG and write splice. T11 is computed with the equation T11=T0−T10, where T0 and T0 are defined using the values shown above.

Determining operation 606 determines the number of completing sectors in the current wedge. The number of completing sectors can include full sector fragments or multiple partial sector fragments (when 'n' is not equal to 0). In one embodiment, determining operation 606 determines Sector_Count(n), wherein Sector_Count(n)=T12(n)/T5. Determining operation 608 determines remainder, T14, before the boundary update. In one embodiment, determining operation 608 determines T14 using the equation T14=T(12) mod T5.

Figure 7:
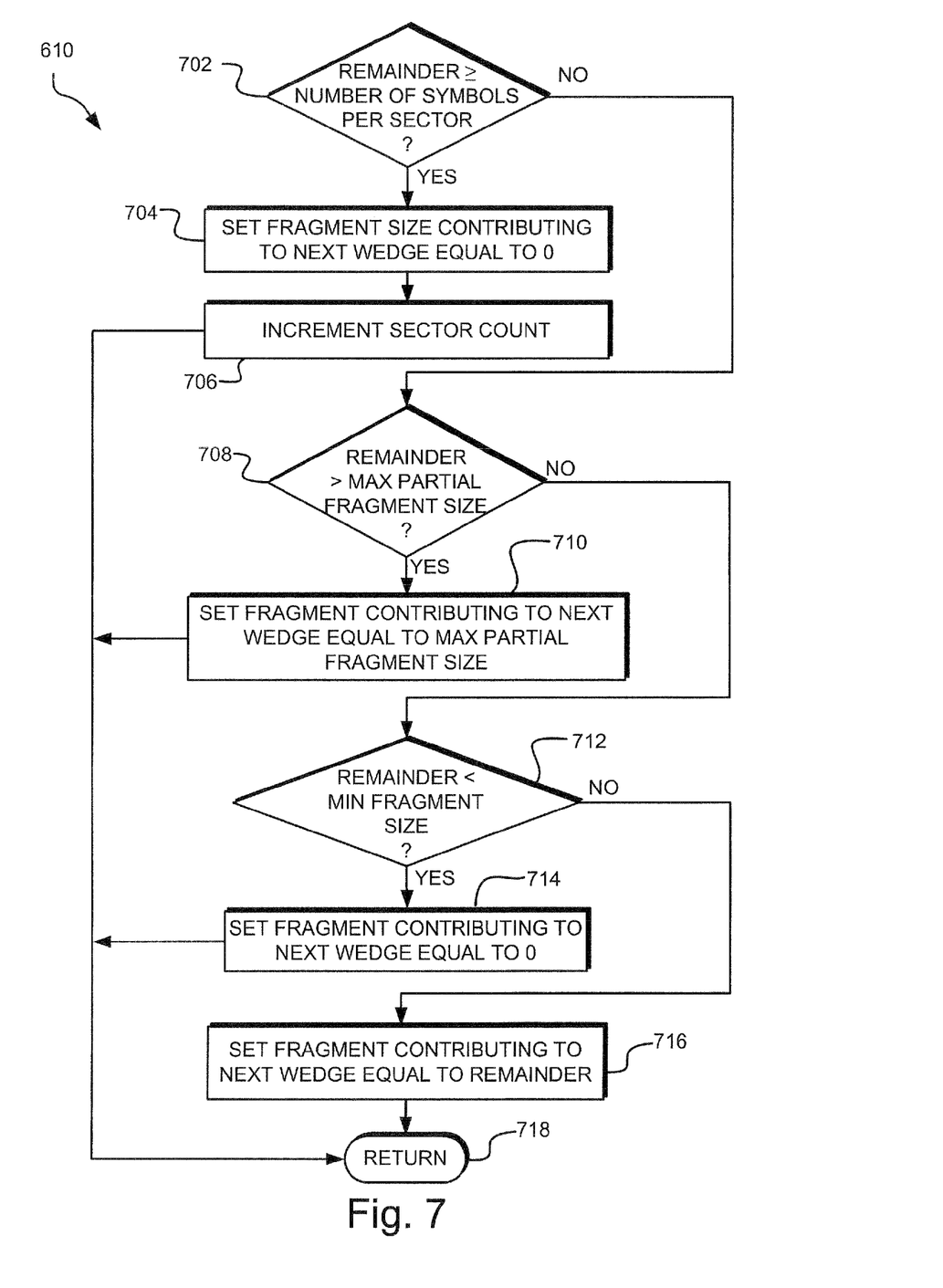

Determining operation 610 determines the sector fragment size, T13(n), that contributes to the next data wedge. One possible embodiment of determining operation 610 is shown in FIG. 7 and described in detail below. Setting operation 612 sets the last usable wedge equal to 'n' if n equals 0 or if Sector_Count(n) is not equal to 0. The last usable wedge refers to the last data wedge that includes a usable sector. The last usable wedge is used later in the algorithm.

Figure 8:
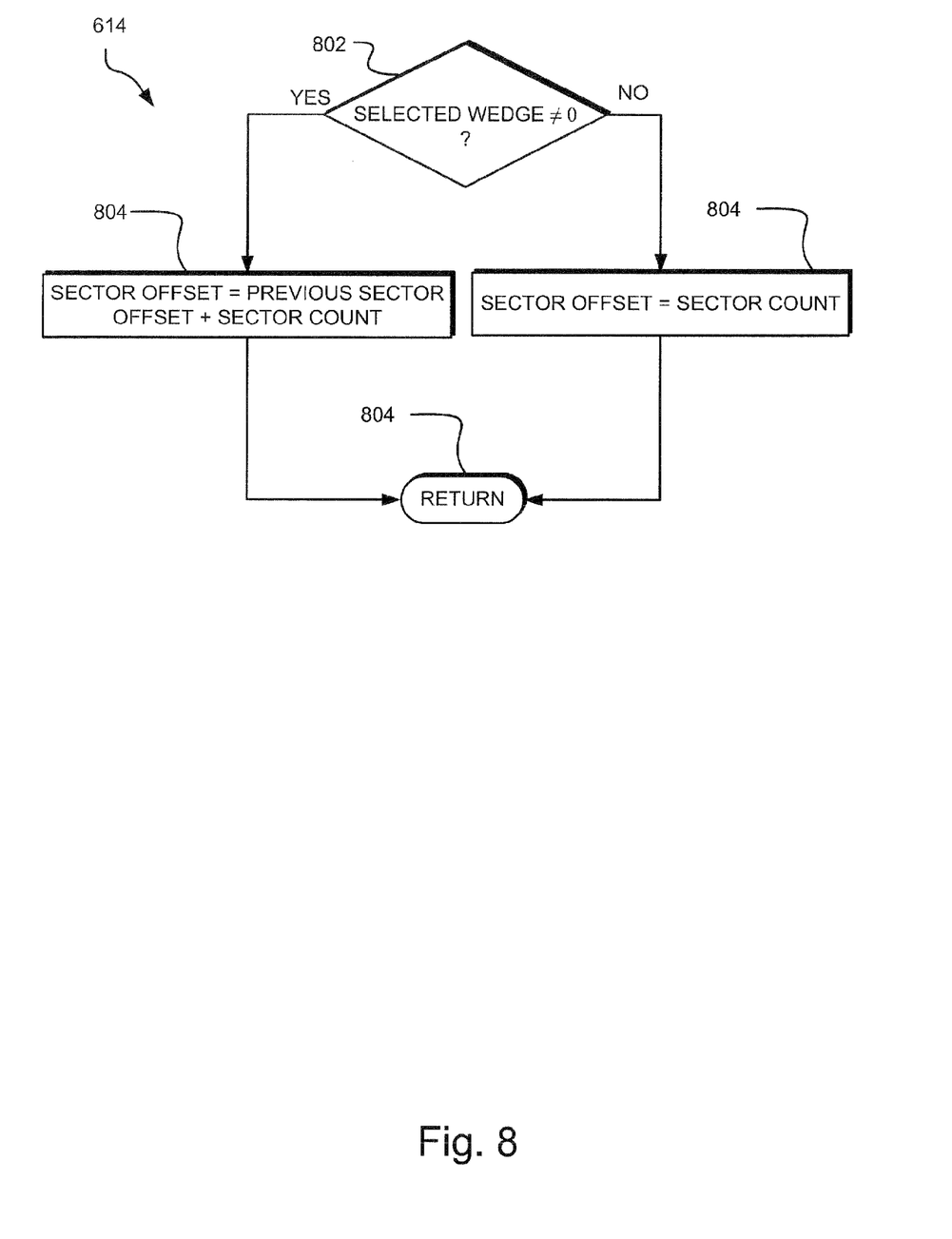
Figure 9:
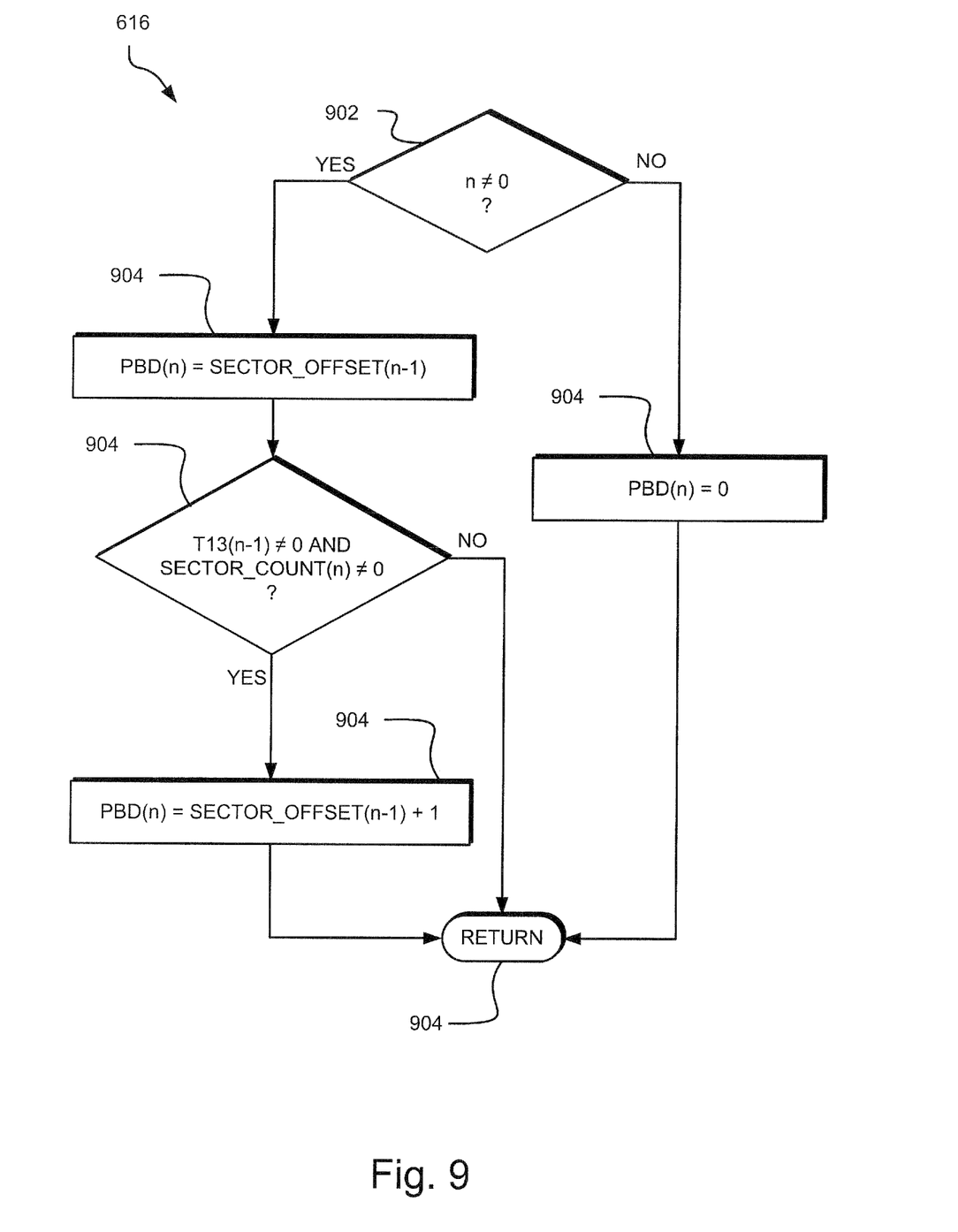
Figure 10:
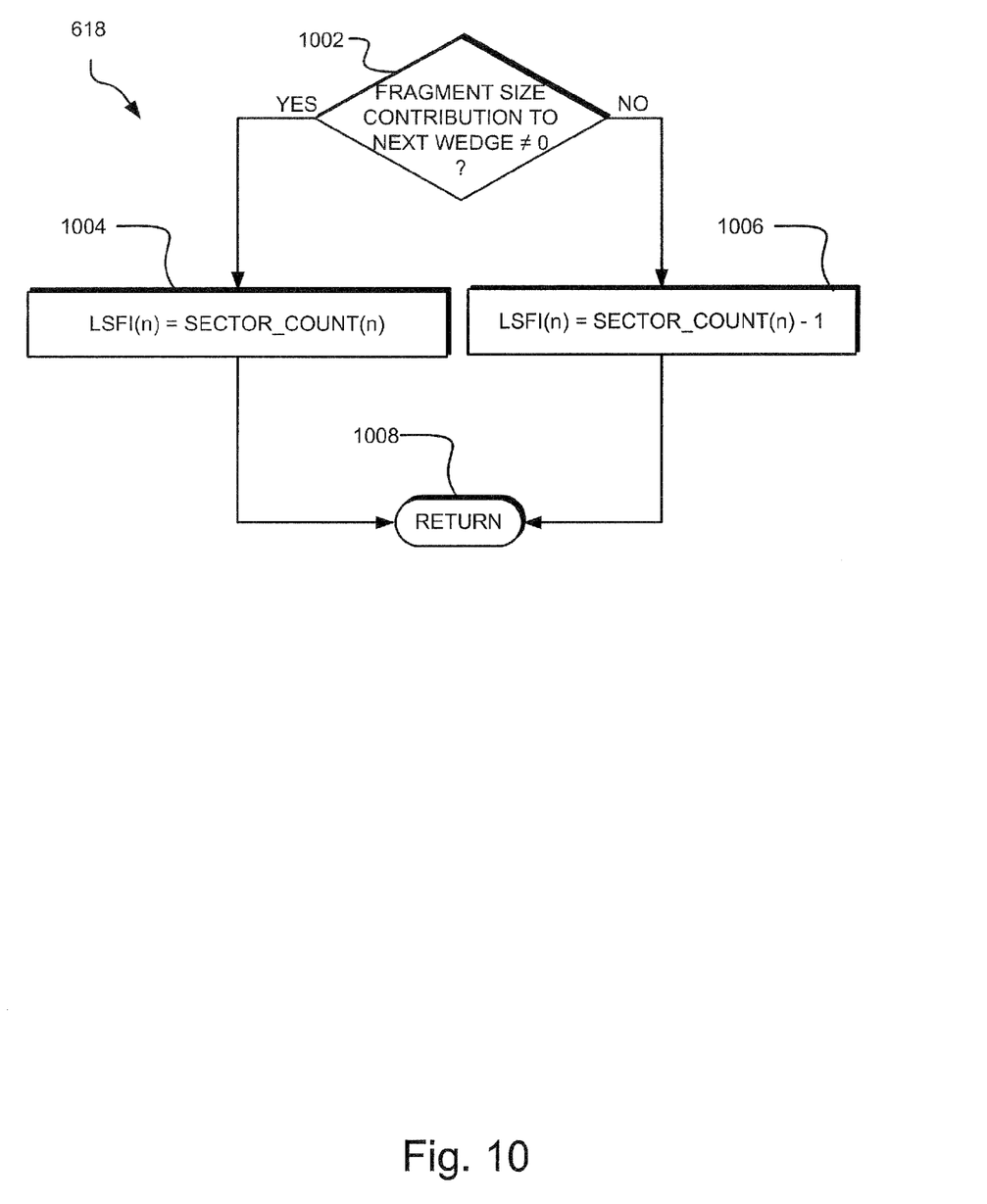
Figure 11:
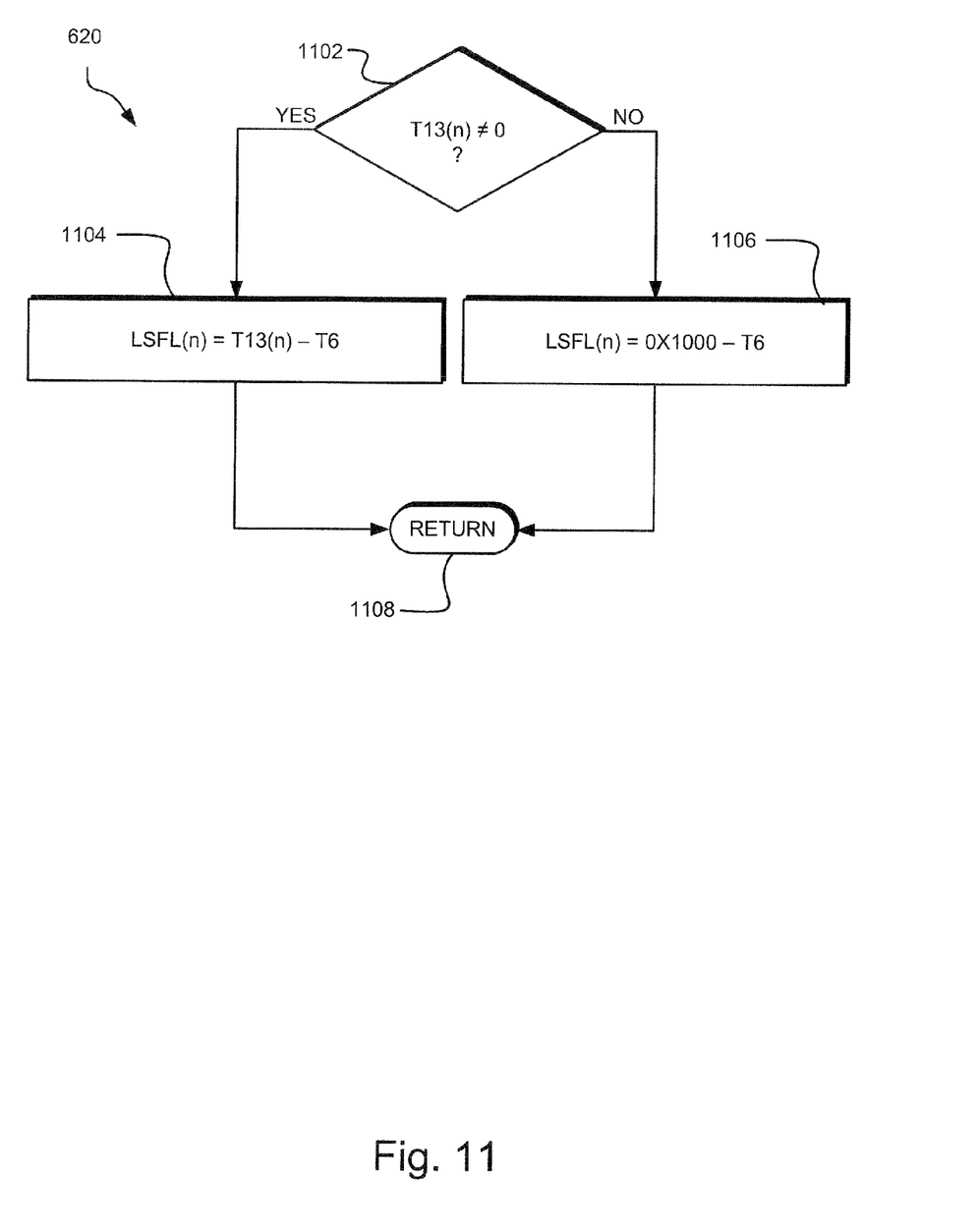

Determining operation 614 determines Sector_Offset(n). An embodiment of determining operation 614 is shown in FIG. 8 and discussed in detail below. Determining operation 616 determines Physical Block Displacement (PBD) of the current data wedge, n. An embodiment of determining operation 616 is shown in FIG. 9 and discussed below. Determining operation 618 determines the Last Sector Fragment Index (LSFI) of the current data wedge. An embodiment of determining operation is shown in FIG. 10 and discussed below. Determining operation 620 determines the Last Sector Fragment Length (LSFL) of the current data wedge. An embodiment of determining operation 620 is shown in FIG. 11 and discussed below.

After determining operation 620, the process repeats from selecting operation 602 until the last wedge in the selected track is processed or until a desired sector of interest is located. For example, generally a particular user data sector is sought to retrieve user data therefrom or to write data thereto. Logic in the disc drive can compare the sector indicated by the PBD to the sector of interest and cause the servo controller to locate the read/write head(s) over the sector indicated by the PBD when the sector indicated by the PBD corresponds to the sector of interest.

After iterating through one or more data wedges in operations 602 through 620, an adjusting operation 622 adjusts LSFI and LSFL if the last usable data wedge does not end on a sector boundary. In one embodiment, adjusting operation determines if T13(last_usable_wedge) is not equal to zero. If T13 of the last usable wedge is not equal to zero, LSFI of the last usable wedge is decremented by one and LSFL of the last usable wedge is set equal to $2^k$-T6, where 'k' is the number of bits used to represent LSFL. LSFL may be viewed as indicating the length of a sector fragment minus the sequencer overhead.

A setting operation 624 sets an initial usable wedge parameter. In one embodiment, the initial usable wedge parameter is set equal to the last usable wedge plus one if the last usable wedge is not equal to 0, and is set equal to zero if the Sector_Count of the initial data wedge is equal to 0.

FIG. 7 is a flowchart illustrating one possible embodiment of determining operation 610. Determining operation 610 determines the sector fragment size of a first data wedge that contributes to a subsequent data wedge. The sector fragment size that contributes to a subsequent data wedge is designated as T13(n), where 'n' indicates the current data wedge. T13(n-1) is used to compute a virtual size of the current data wedge. The virtual size of the subsequent data wedge is designated as T12(n). As described above with reference to FIG. 6, T12(n) is used to computer the Sector_Count(n).

In FIG. 7, a query operation 702 determines whether a sector fragment remainder of a current data wedge is greater than or equal to the number of symbols in a full sector. The remainder is designated as T14(n). If T14(n) is greater than or equal to the number of symbols per sector the operation 610 branches "YES" to setting operation 704. Setting operation 704 sets the contributing fragment size, T13(n), equal to zero. An incrementing operation 706 then increments the Sector_Count(n) of the current data wedge.

On the other hand, if query operation 702 determines that the remainder, T14(n), is not greater than or equal to the number of symbols per sector, the operation 610 branches "NO" to another query operation 708. Query operation 706 determines whether the remainder, T14(n), is greater than the maximum partial sector fragment size, T9. If T14(n) is greater than the maximum partial sector fragment size, T9, the operation 610 branches "YES" to setting operation 710. Setting operation 710 sets the contributing fragment size, T13(n), equal to the maximum partial sector fragment size, T9.

On the other hand, if query operation 708 determines that the remainder, T14(n), is not greater than the maximum partial sector fragment size, T9, the operation 610 branches "NO" to another query operation 712. Query operation 712 determines whether the remainder, T14(n), is less than the minimum partial sector fragment size, T8. If T14(n) is less than T8, the operation 610 branches "YES" to setting operation 714. Setting operation sets the contributing fragment size, T13(n), equal to zero.

On the other hand, if query operation 712 determines that remainder, T14(n), is not less than the minimum partial sector fragment size, T8, the operation 610 branches "NO" to setting operation 716. Setting operation 716 sets the contributing fragment size, T13(n), equal to the remainder, T14(n). After incrementing operation 706, setting operation 710, setting operation 714 and setting operation 716, the operation 610 returns at returning operation 718.

FIG. 8 is a flowchart illustrating an embodiment of determining operation 614. Determining operation 614 determines Sector_Offset(n). In general, operation 614 maintains a running count of complete sectors along a given track. Initially, a query operation 802 determines whether the current data wedge, n, is not equal to zero (i.e., the initial wedge). If the current data wedge is not the initial data wedge, the operation 614 branches "YES" to setting operation 804. Setting operation 804 adds the number of completed sectors to the number of completed sectors from prior data wedges. In one embodiment, setting operation 804 sets Sector_Offset(n) equal to Sector_Offset(n-1) plus the Sector_Count(n).

On the other hand, if query operation 802 determines that the current data wedge is the initial data wedge, the operation 614 branches "NO" to setting operation 806. Setting operation 806 initializes the number of completed sectors to the number of completed sectors in the current data wedge. In one embodiment, setting operation 806 sets Sector_Offset(n) equal to Sector_Count(n). After setting operation 804 and setting operation 806, operation 614 returns at returning operation 808.

FIG. 9 is a flowchart illustrating an embodiment of determining operation 616. Determining operation 616 determines the PBD for a current data wedge designated by 'n'. Query operation 902 determines whether 'n' is not equal to zero (i.e., the current data wedge is not the initial data wedge). If query operation 902 determines that the current data wedge is not the initial data wedge, the operation 616 branches "YES" to setting operation 904. Setting operation 904 sets the PBD of the current data wedge equal to the previous sector offset.

Another query operation 906 determines if the contributing partial sector fragment, T13(n-1), and the sector count, Sector_Count(n), are not equal to zero. Query operation 906 essentially determines if a partial sector fragment began in a previous data wedge and completed in the current data wedge. If query operation 906 determines that a partial sector fragment began in a previous data wedge and completed in the current data wedge, the operation 616 branches "YES" to incrementing operation 908. Incrementing operation 908 adds one to PBD of the current data wedge.

If query operation 906 determines that the contributing partial sector fragment is zero or the sector count of the current data wedge is zero, the operation 616 branches "NO" to return operation 910. Referring again to query operation 902, if the current data wedge is the initial data wedge, the operation 616 branches "NO" to setting operation 912. Setting operation 912 sets PBD of the current data wedge equal to zero. After incrementing operation 908 and setting operation 912, operation 616 branches to return operation 910.

FIG. 10 is a flowchart illustrating an embodiment of determining operation 618. Determining operation 618 determines LSFI for a current data wedge. A query operation 1002 determines whether the contributing partial sector fragment size, T13(n-1), is not equal to zero. If contributing partial sector fragment size is not equal to zero, operation 618 branches "YES" to setting operation 1004 which sets LSFI of the current data wedge equal to the sector count for the current data wedge.

If query operation 1002 determines that the contributing partial sector fragment size is equal to zero, the operation 618 branches "NO" to setting operation 1006. Setting operation 1006 sets LSFI of the current data wedge equal to the sector count of the current data wedge minus one. Operation 618 then returns via returning operation 1008.

FIG. 11 is a flowchart illustrating an embodiment of determining operation 620. Determining operation 620 determines the LSFL of a current data wedge. Query operation 1102 determines whether the contributing partial sector fragment length of the current wedge, T13(n), is not equal to zero. If T13(n) is not equal to zero, operation 620 branches "YES" to setting operation 1104. Setting operation 1104 sets LSFL of the current data wedge equal to T13(n) minus non-data sector symbols required to process the partial sector fragment, T6.

If query operation 1102 determines that the contributing partial sector fragment length of the current wedge, T13(n), is equal to zero, operation 620 branches "NO" to setting operation 1106. Setting operation 1106 sets LSFL of the current data wedge equal to a maximum threshold value, 0×1000, minus the non-data sector symbols required to process the partial sector fragment, T6. In this case the value 0×1000 is used because 12 bits are allocated to LSFL.

Figure 12:
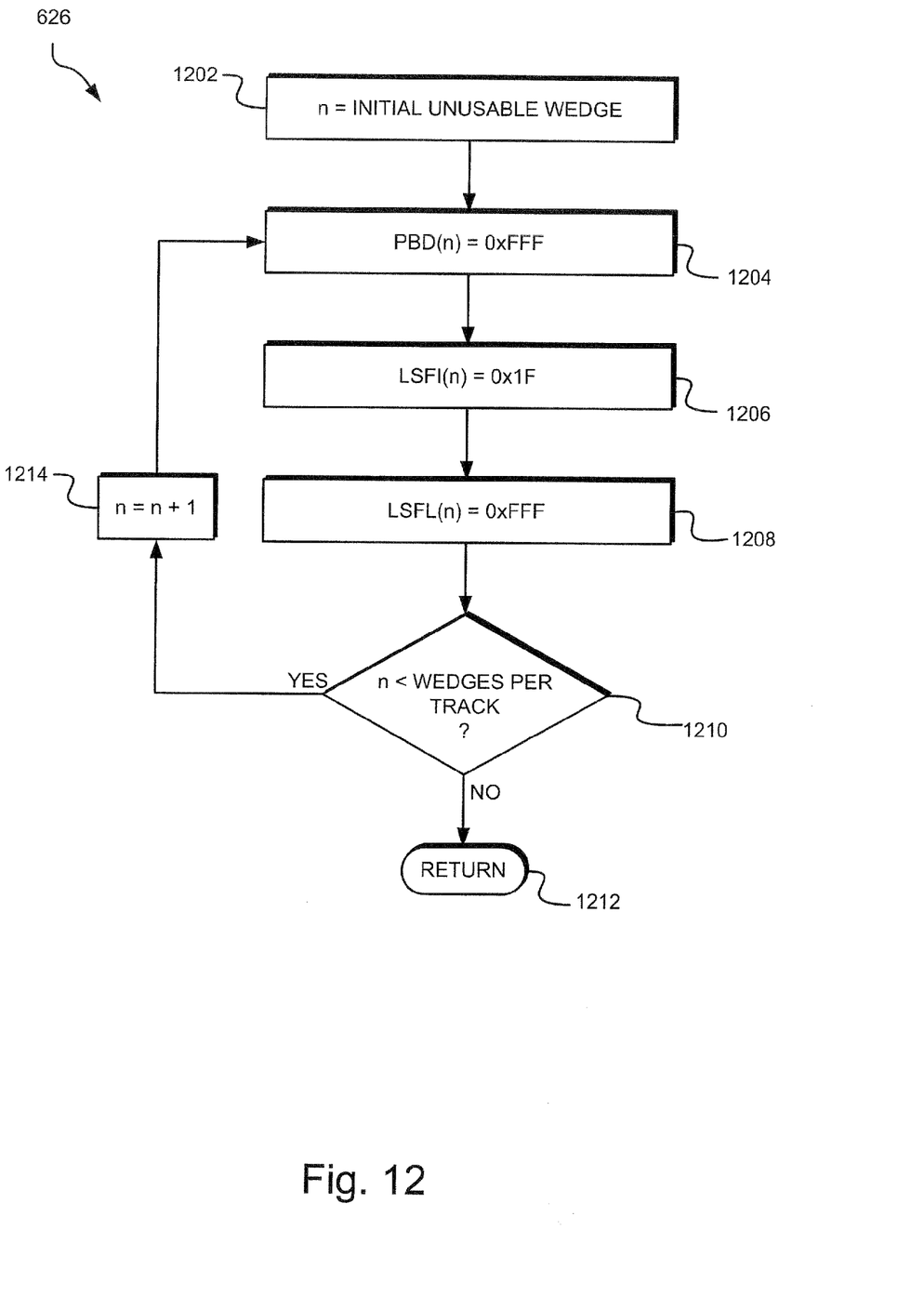

FIG. 12 is a flowchart illustrating an embodiment of initializing operation 626. Initializing operation 626 iterates through any unusable data wedges on a track and initializes PBD, LSFI and LSFL for each unusable data wedge. Starting operation 1202 sets a data wedge counter, 'n', equal to the first unusable data wedge in the track.

An initializing operation 1204 sets PBD for the data wedge identified by 'n' to an initial value, such as 0×FFF. Initializing operation 1206 sets LSFI for the data wedge identified by 'n' equal to an initial value, such as 0×1F. Initializing operation 1208 sets LSFL for the data wedge identified by 'n' equal to an initial value, such as 0×FFF. Query operation 1210 determines if more data wedges are on the track. If so, operation 626 branches "YES" to incrementing operation 1214 where data wedge counter, 'n', is incremented. If no more data wedges are on the track, operation 626 branches "NO" to return operation 1212.

Although any algorithms described here may be implemented in software, hardware, firmware or any combination thereof, the algorithms shown in FIGS. 6-12 and described above may be more suited for implementation in software and firmware than hardware. A hardware implementation is essentially iterative and is generally based on the algorithms shown and described in FIGS. 6-12.

One embodiment of a hardware implementation may vary from the previously described embodiment to take advantage of various hardware capabilities. The following values can be used in this embodiment. These values are initialized in registers by the microprocessor 242:

Maximum Full Sector per Wedge: Below mentioned X, 5 bits.
Last usable wedge: Wedges following are unusable, 12 bits
T11: Number of symbols per data wedge that can be used, 16 bits
T4: Number of symbols per full sector, 12 bits.
T8: Minimum number of symbols in a partial sector fragment, 8 bits
T9: Maximum number of symbols in a partial sector fragment, 16 bits
T15: Number of symbols in X full sectors plus associated overhead (X*T5), 16 bits.
T16: Number of symbols in (X+1) full sectors plus associated overhead, 16 bits.

In a hardware implementation, the track description generator will initially search for a valid servo wedge number at the leading edge of the S-Gate signal. Then it will run the previously described algorithm in a modified form, until the track description entry is calculated.

The track description generator iteratively loops, calculating T13(n), Sector_Count(n) and Sector_Offset(n) for each data wedge from the initial wedge virtual number (0) to the current wedge. After catching up with the current wedge virtual number as indicated by the servo logic, the hardware calculates the track description entry parameters for the current wedge. After catching up and calculating the associated track description entry, the hardware iterates once to calculate values for the next wedge.

In an implementation, the track description entry is generated in the first leading edge of a first S-Gate pulse to a following S-Gate pulse. If it is not possible to get oriented within the first leading edge, the track description generator will attempt to get oriented by the next leading edge of the S-Gate signal. The hardware can be programmed up to the number of servos on the track, to get oriented. In the case when more then one data wedge is required to be oriented, the hardware suspends iterating through it internal servo count and preserves it's internal hardware state, and waits for the trailing edge of SGATE to resumes iterating and trying to catch up with the actual servo number in the next data wedge. It is desirable for performance reasons to get oriented within one data wedge, and as is shown below given the state of current technology that is what will occur. A worst case scenario assumes 500 servo wedges, 12 microseconds between S-Gate pulses, 160 MHz clock frequency (6.25 nanosecond period), 3 memory clocks of calculation time per data wedge, 20 memory clocks of overhead calculating the track description entry values and other logic overhead before being oriented. Under this worst case scenario, the following time is available:

((500 Servo/Rev)(3 mem_clk_per_calc)+20 mem_clk)(6.25 ns per mem_clk)=9500 ns=9.5 microseconds.

Given the foregoing assumptions, sufficient margin exists to calculate the track descript entry values in one trailing edge of S-Gate to leading edge of S-Gate time when the disc drive is un-oriented.

The above specification, examples and data provide a complete description of the structures of exemplary implementations of apparatus that may be used for automatically generate a track description. Although various implementations of the apparatus have been described above with a certain degree of particularity, or with reference to one or more individual implementations, those skilled in the art could make numerous alterations to the disclosed implementations without departing from the spirit or scope of this invention. It is intended that all matter contained in the above description and shown in the accompanying drawings shall be interpreted as illustrative only of particular implementations and not limiting. Changes in detail or structure may be made without departing from the basic elements of the invention as defined in the following claims.

What is claimed is:

1. A method, comprising generating a track description in real-time describing at least a portion of a track of a storage medium, wherein the storage medium is logically segmented into a plurality of data wedges and the track description comprises a physical block displacement (PBD), a last sector fragment index (LSFI), and a last sector fragment length (LSFL).

2. A method according to claim 1, wherein dynamically generating the track description comprises determining the track description for a data wedge prior to synchronization of that data wedge.

3. A method according to claim 1, wherein the tracks are substantially circular.

4. A method according to claim 1, wherein the PBD indicates a sector displacement from a starting location of a track, the LSFI indicates which sector fragment is the last sector fragment in a data wedge, and LSFL indicates the number of symbols in the last sector fragment in the data wedge.

5. A method according to claim 1, further comprising processing data at a sector indicated by the PBD if the sector indicated by the PBD corresponds to a desired sector.

6. A method according to claim 1, wherein dynamically generating the track description comprises:
   determining a sector count indicating a number of completed sectors in a first data wedge;
   determining a remainder of a sector fragment in the first data wedge;
   determining a contributing fragment size indicating a length of a partial sector fragment in the first data wedge that contributes to a sector fragment in a subsequent data wedge;
   setting a last sector fragment index (LSFI) equal to the sector count if the contributing fragment size is nonzero; and
   setting the LSFI equal to sector count minus one if the contributing fragment size is zero.

7. A method according to claim 1, further comprising maintaining a running count of completed sectors around the track.

8. The method of claim 1, further comprising using the track-description to determine if a given sector is the last sector fragment in a data wedge.

9. Apparatus, comprising a dynamic track description generator configured to dynamically generate a track description describing a data wedge of a track on a storage medium, wherein the track description is generated at a time prior to synchronization with the data wedge, wherein the storage medium is logically segmented into a plurality of data wedges and the track description comprises a physical block displacement (PBD), a last sector fragment index (LSFI), and a last sector fragment length (LSFL).

10. Apparatus according to claim 9, wherein the tracks are substantially circular.

11. Apparatus according to claim 9, wherein the PBD indicates a sector displacement from a starting location of a track, the LSFI indicates which sector fragment is the last sector fragment in a data wedge, and LSFL indicates the number of symbols in the last sector fragment in the data wedge.

12. Apparatus according to claim 9, further comprising a processor that processes data at a sector indicated by the PBD if the sector indicated by the PBD corresponds to a desired sector.

13. Apparatus according to claim 9, wherein the dynamic track description generator determines the track description for a data wedge prior to synchronization of that data wedge.

14. Apparatus according to claim 9, further comprising
   media counting hardware that determines a sector count indicating a number of completed sectors in a first data wedge;
   determines a remainder of a sector fragment in the first data wedge;
   determines a contributing fragment size indicating a length of a partial sector fragment in the first data wedge that contributes to a sector fragment in a subsequent data wedge;
   sets a last sector fragment index (LSFI) equal to the sector count if the contributing fragment size is nonzero; and
   sets the LSFI equal to sector count minus one if the contributing fragment size is zero.

15. Apparatus according to claim 9, further comprising a counter maintaining a running count of completed sectors around the track.

16. System, comprising:
   a storage medium;
   a dynamic track description generator configured to dynamically generate a track description describing a data wedge of a track on the storage medium, wherein the track description is generated at a time prior to synchronization with the data wedge, and
   media counting hardware configured to:
      determine a sector count indicating a number of completed sectors in a first data edge;
      determine a remainder of a sector fragment in the first data wedge;
      determine a contributing fragment size indicating a length of a partial sector fragment in the first data wedge that contributes to a sector fragment in a subsequent data wedge;
      set a last sector fragment index (LSFI) equal to the sector count if the contributing fragment size is nonzero; and
      set the LSFI equal to sector count minus one if the contributing fragment size is zero.

* * * * *